US010444845B2

United States Patent
Ramachandran et al.

(10) Patent No.: US 10,444,845 B2
(45) Date of Patent: Oct. 15, 2019

(54) DISPLAY OF SEPARATE COMPUTER VISION BASED POSE AND INERTIAL SENSOR BASED POSE

(71) Applicant: QUALCOMM Incorporated, San Diego, CA (US)

(72) Inventors: Mahesh Ramachandran, San Diego, CA (US); Christopher Brunner, San Diego, CA (US); Arvind Ramanandan, San Diego, CA (US); Serafin Diaz Spindola, San Diego, CA (US); Murali Ramaswamy Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 13/725,175

(22) Filed: Dec. 21, 2012

(65) Prior Publication Data

US 2014/0176418 A1     Jun. 26, 2014

(51) Int. Cl.
*G06F 3/01*     (2006.01)
*G01C 21/16*     (2006.01)
(Continued)

(52) U.S. Cl.
CPC ........... *G06F 3/017* (2013.01); *G01C 21/165* (2013.01); *G01C 25/005* (2013.01);
(Continued)

(58) Field of Classification Search
CPC .... G01C 21/165; G01C 25/005; G01C 17/38; G06T 7/0018; G06T 7/0042;
(Continued)

(56) References Cited

U.S. PATENT DOCUMENTS 8,046,928 B2    11/2011    Choi
8,189,058 B2    5/2012    Molgaard
(Continued)

FOREIGN PATENT DOCUMENTS

CN      1711516 A     12/2005
CN      1777527 A      5/2006
(Continued)

OTHER PUBLICATIONS

International Search Report and Written Opinion—PCT/US2013/073511—ISA/EPO—dated Apr. 7, 2014.
(Continued)

*Primary Examiner* — Jimmy H Nguyen
(74) *Attorney, Agent, or Firm* — Silicon Valley Patent Group LLP (57) ABSTRACT

A mobile device determines a vision based pose using images captured by a camera and determines a sensor based pose using data from inertial sensors, such as accelerometers and gyroscopes. The vision based pose and sensor based pose are used separately in a visualization application, which displays separate graphics for the different poses. For example, the visualization application may be used to calibrate the inertial sensors, where the visualization application displays a graphic based on the vision based pose and a graphic based on the sensor based pose and prompts a user to move the mobile device in a specific direction with the displayed graphics to accelerate convergence of the calibration of the inertial sensors. Alternatively, the visualization application may be a motion based game or a photography application that displays separate graphics using the vision based pose and the sensor based pose.

24 Claims, 5 Drawing Sheets

(51) Int. Cl.
- *G01C 25/00* (2006.01)
- *G06F 3/0487* (2013.01)
- *G06F 3/0346* (2013.01)
- *G06T 7/80* (2017.01)
- *G06T 7/73* (2017.01)
- *G06F 3/03* (2006.01)

(52) U.S. Cl.
CPC .......... *G06F 3/0304* (2013.01); *G06F 3/0346* (2013.01); *G06F 3/0487* (2013.01); *G06T 7/73* (2017.01); *G06T 7/80* (2017.01); *G06T 2207/30208* (2013.01)

(58) Field of Classification Search
CPC . G06T 2207/30244; G06T 2207/30208; G06F 3/0346; G06F 3/017; G06F 3/0487; G06F 3/0304
USPC ................... 345/156–158; 382/291; 702/93; 715/856–858
See application file for complete search history.

(56) References Cited

U.S. PATENT DOCUMENTS

| | | | |
|---|---|---|---|
| 8,255,161 | B2 | 8/2012 | Bye et al. |
| 8,912,979 | B1* | 12/2014 | Gomez .................. G09G 3/001 345/7 |
| 2005/0008256 | A1 | 1/2005 | Uchiyama et al. |
| 2005/0232467 | A1* | 10/2005 | Mohri .................. G06F 3/0304 382/103 |
| 2006/0221098 | A1 | 10/2006 | Matsui et al. |
| 2011/0178708 | A1* | 7/2011 | Zhang et al. .................. 701/221 |
| 2011/0275408 | A1 | 11/2011 | Kulik |
| 2011/0307173 | A1 | 12/2011 | Riley et al. |
| 2011/0310283 | A1* | 12/2011 | Shiozaki .................. 348/333.06 |
| 2012/0176491 | A1 | 7/2012 | Garin et al. |
| 2012/0206129 | A1* | 8/2012 | Mahan et al. .................. 324/202 |
| 2014/0118479 | A1 | 5/2014 | Rapoport et al. |

FOREIGN PATENT DOCUMENTS

| | | |
|---|---|---|
| EP | 1501051 A2 | 1/2005 |
| EP | 1594039 A1 | 11/2005 |
| EP | 1708139 A2 | 10/2006 |
| JP | 2005033319 A | 2/2005 |
| JP | 2005050189 A | 2/2005 |
| JP | 2006285787 A | 10/2006 |
| JP | 2011145744 A | 7/2011 |
| JP | 2011198150 A | 10/2011 |
| JP | 2012004899 A | 1/2012 |
| TW | I333156 | 11/2010 |
| TW | I341692 | 5/2011 |
| TW | I348639 | 9/2011 |
| WO | 2011088469 | 7/2011 |

OTHER PUBLICATIONS

Jones, et al., "Visual-Inertial Navigation, Mapping and Localization: A Scalable Real-Time Causal Approach," International Journal of Robotics Research, Sep. 23, 2010, pp. 1-38.

Lobo et al., "Relative Pose Calibration Between Visual and Inertial Sensors," Institute of Systems and Robotics University of Coimbra, Portugal, The International Journal of Robotic Research, Jun. 2007, pp. 561-575.

Mirzaei, et al., "A kalman filter-based algorithm for IMU-camera calibration," Proceedings of the 2007 IEEE/RSJ International Conference on Intelligent Robots and Systems, San Diego, CA USA, Oct. 29-Nov. 2, 2007, pp. 2427-2434.

Nebot, et al., "Initial calibration and alignment of low-cost inertial navigation units for land-vehicle applications," Journal of Robotics Systems, vol. 16, No. 2, Feb. 1999, pp. 81-92.

Taiwan Search Report—TW102147644—TIPO—dated Feb. 13, 2015.

Flatla D. R., et al., "Calibration Games: Making Calibration Tasks Enjoyable by Adding Motivating Game Elements," Proceedings of the 24th annual ACM symposium on User interface software and technology (UIST '11), Oct. 16-19, 2011, Santa Barbara, CA, USA, pp. 403-412.

Taiwan Search Report—TW105112885—TIPO—dated Mar. 10, 2017.

Kobori N., et al., "Accurate and Robust Attitude Estimation Using MEMS Gyroscopes and a Monocular Camera", Jan. 21, 2012, Transactions of the Society of Instrument and Control Engineers, vol. 47, No. 10 (2011), 8 Pages.

\* cited by examiner

DISPLAY OF SEPARATE COMPUTER VISION BASED POSE AND INERTIAL SENSOR BASED POSE

BACKGROUND

Background Field

Embodiments of the subject matter described herein are related generally to using a computer vision based pose and an inertial sensor based pose separately in a visualization application, and more specifically to displaying separate graphics for the computer vision based pose and the inertial sensor based pose to prompt user movement of the mobile device.

Relevant Background

An increasing number of mobile devices, such as smartphones, tablet computers, cameras, etc., include various types of inertial sensors in addition to a camera. Inertial sensors, such as accelerometers and gyroscopes, are useful for tracking movement of a mobile device due to their ability to measure acceleration and angular velocity at high sampling rates. Many applications, such as augmented reality, indoor navigation, etc., use a combination of inertial sensors and computer vision for a determination of the pose (position and orientation) and tracking of the mobile device.

In order for inertial sensors to be used for accurate position determination, particularly when combined with computer vision techniques, accurate calibration of the inertial sensors is required. Calibration of the inertial sensors includes alignment of inertial sensors with respect to camera, as well as calibration of scale and non-orthogonality parameters of the inertial sensors. Calibration of inertial sensors, however, is currently a time consuming factory process, which is required for each individual mobile device. During factory calibration of inertial sensors, a series of precise movements of the mobile device is performed and correlated to the response of the inertial sensors. While some approaches for calibration of sensors with user motion exist, the performance of such approaches is heavily dependent on supplying user motions that are similar in quality to factory motions. Instructing users to provide complicated and yet highly accurate motion is difficult. Without these rich motions, however, factory calibration, with its accompanying increase in cost, is the only way to get reliably obtain accurate calibration parameters.

SUMMARY

A mobile device determines a vision based pose using images captured by a camera and determines a sensor based pose using data from inertial sensors, such as accelerometers and gyroscopes. The vision based pose and sensor based pose are used separately in a visualization application, which displays separate graphics for the different poses. For example, the visualization application may be used to calibrate the inertial sensors, where the visualization application displays a graphic based on the vision based pose and a graphic based on the sensor based pose and prompts a user to move the mobile device in a specific direction with the displayed graphics to accelerate convergence of the calibration of the inertial sensors. Alternatively, the visualization application may be a motion based game or photography application that displays separate graphics using the vision based pose and the sensor based pose.

In one implementation, a method includes determining a vision based pose of a mobile device using captured images; determining a sensor based pose of the mobile device using inertial sensors; and using the vision based pose and the sensor based pose separately in a visualization application.

In one implementation, a mobile device includes a camera that captures images of an environment; inertial sensors that produce data in response to movement of the mobile device; a display; and a processor coupled to the display, coupled to the camera to receive captured images of the environment and coupled to the inertial sensors to receive the data in response to the movement of the mobile device, the processor configured to determine a vision based pose of the mobile device using the captured images; determine a sensor based pose of the mobile device using the data from the inertial sensors; and to cause the display to show a first graphic based on the vision based pose and to show a second graphic based on the sensor based pose.

In one implementation, a mobile device includes means for determining a vision based pose of the mobile device using captured images; means for determining a sensor based pose of the mobile device using inertial sensors; and means for using the vision based pose and the sensor based pose separately in a visualization application.

In one implementation, a storage medium including program code stored thereon, includes program code to determine a vision based pose of a mobile device using captured images; program code to determine a sensor based pose of the mobile device using inertial sensors; and program code to use the vision based pose and the sensor based pose separately in a visualization application.

DETAILED DESCRIPTION

Figure 1:
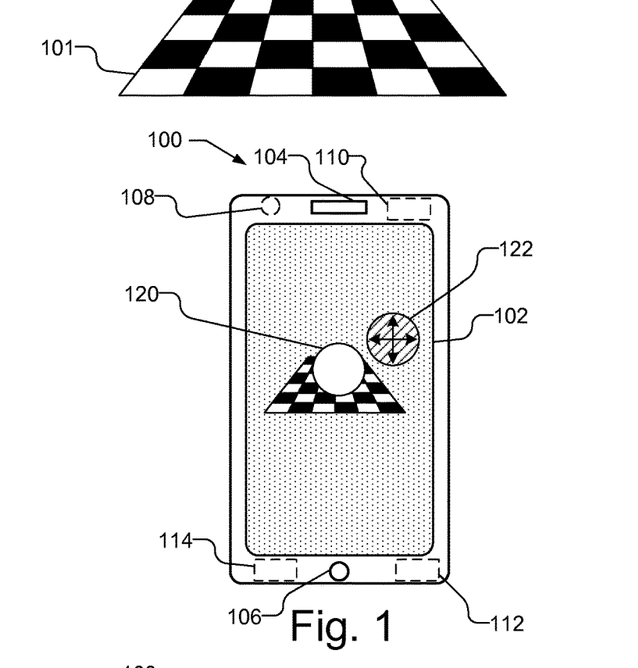
FIG. 1 illustrates a mobile device capable of determining a vision based pose from captured images and a sensor based pose from inertial sensors and using the vision based pose and the sensor based pose separately in a visualization application.

FIG. 1 illustrates a mobile device 100 capable of determining a vision based pose from captured images and a sensor based pose from inertial sensors and using the vision based pose and the sensor based pose separately in a visualization application. The visualization application displays separate graphics for the vision based pose and the sensor based pose, sometimes respectively referred to herein as a vision based graphic and a sensor based graphic. The visualization application, by way of example, may be used to calibrate the inertial sensors, gaming, photography, etc. The inertial sensors may be calibrated, for example, based on user manipulation of the mobile device in response to the displayed graphics. The mobile device 100 is illustrated as including a display 102, which may be, but is not necessarily, a touch screen display. The mobile device 100 includes a forward facing camera 108 to image the environment, such as the target 101, which is illustrated as being shown on display 102. The mobile device 100 also includes inertial sensors 110, such as accelerometers, gyroscopes or the like. The mobile device 100 may also include other features that are not relevant to the present disclosure, such as a speaker 104 and microphone 106, e.g., if the mobile device 100 is a cellular telephone.

As used herein, a "mobile device" refers to any portable electronic device capable of vision-based position detection and tracking from captured images or video streams and that includes inertial sensors, and may include a e.g., cellular or other wireless communication device, personal communication system (PCS) device, personal navigation device (PND), Personal Information Manager (PIM), Personal Digital Assistant (PDA), or other suitable mobile device including cameras, wireless communication devices, computers, laptops, tablet computers, etc. The mobile device may be, but need not necessarily be capable of receiving wireless communication and/or navigation signals, such as navigation positioning signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

The mobile device 100 includes a vision pose module 112 that uses the images captured by the camera 108, e.g., the series of video frames produced by the camera 108, to generate a vision based pose. A vision based pose is a position and orientation of the mobile device that is determined using computer vision techniques. It should be understood that the camera 108 may capture images and/or frames of video, and that the terms image and frame are used interchangeably herein. The mobile device 100 further includes an inertial sensory system (INS) 114 that uses the output of the inertial sensors 110 to generate the sensor based pose. It should be understood that one or both of the vision based pose and the sensor based pose may be initialized based on the other, but otherwise, as used herein, the vision based pose is independent of the sensor based pose, and the sensor based pose is independent of the vision based pose. Thus, at a current time instant the vision based pose and the sensor based pose are independent when rendering a current set of augmentations; but they could have been fused together at a past time instant.

The mobile device 100 uses a visualization application that displays separate graphics on the display 102 based on the vision based pose generated from the captured images and the sensor based pose generated from inertial sensor data. For example, as illustrated in FIG. 1, the mobile device 100 may render a first graphic 120 based on the vision based pose generated by the vision pose module 112 and a second graphic 122 based on the sensor based pose generated by the INS 114. If desired, the vision based graphic 120 and the sensor based graphic 122 may be different color channels of the same rendered object or they may be different objects.

FIG. 1 illustrates the graphics 120 and 122 as balls, but it should be understood that any type of graphics may be used. Moreover, if desired, multiple graphics may be used for the vision based pose and multiple graphics may be used for the sensor based pose. For example, as discussed below, one or more horizontal bars and one or more vertical bars may be rendered based on the vision based pose and, similarly, horizontal and vertical bars may be rendered based on the sensor based pose. If desired, the rendered graphics may be more complicated or animated, e.g., a cat may be rendered based on the vision based pose and a mouse rendered based on the sensor based pose, wherein the cat is controlled to catch the mouse based on user motion.

The visualization application separately displays the vision based graphic and sensor based graphic to prompt user movement of the mobile device. For example, the visualization application may be entertainment, e.g., a game. Another application may be related to photography. For example, to produce a three-dimensional image using a single camera, the mobile device is moved to different perspectives, while maintaining the imaged subject centered in the display. Thus, a vision based graphic may be displayed stationary relative to the subject, while movement of the sensor based graphic, prompts the user to move the mobile device to different perspectives in order to maintain alignment of the vision based graphic and sensor based graphic. In another example, to produce a panorama, it is desirable to maintain the position of the camera while panning the camera. Thus, a sensor based graphic may be displayed as stationary in the display, while movement of the vision based graphic, prompts the user to rotate the mobile device while holding the position stationary in order to maintain alignment of the vision based graphic and sensor based graphic.

Another example of the visualization application is for calibration of the inertial sensors 110. Calibration of the alignment as well as scale and non-orthogonality of the inertial sensors 110 and the camera 108 may use the vision based poses as external measurements. Moreover, the user is prompted to move the mobile device 100 with desired trajectories for the calibration based on the display of the vision based graphic and sensor based graphic. Thus, the user is incentivized move the mobile device along desired trajectories to collect good-quality data which can be fed into the calibration algorithm.

The mobile device 100 collects data from the inertial sensors 110 produced in response to movement of the mobile device 100 while capturing images that are used to generate the vision based pose. The vision based pose and sensor data can be used for calibration of the inertial sensors. The vision based graphic 120 and sensor based graphic 122 may be rendered to prompt the user to move the mobile device, as well as feedback to the user with respect to the status of the calibration of the inertial sensors, such as the calibration accuracy and confidence in calibration parameter. Thus, the mobile device 100 may use the visualization application to allow the user to visualize the inertial sensor calibration accuracy and adaptively change user interaction with the mobile device based on the confidence in the calibration parameter estimates.

Figure 2:
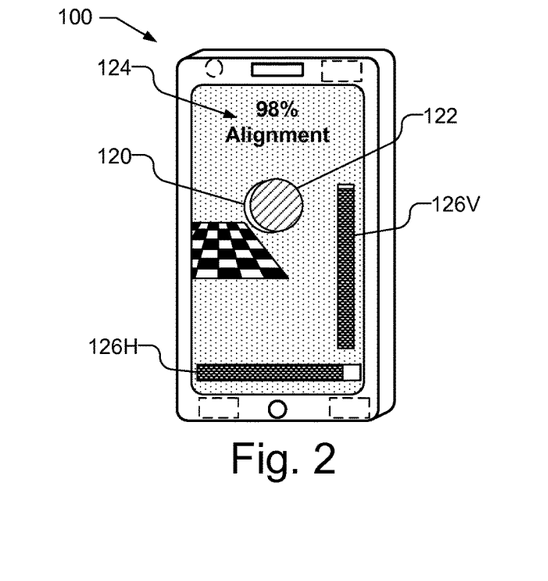
FIG. 2 illustrates one possible implementation of graphics that may be used by the mobile device in the visualization application.

FIG. 2, by way of example, illustrates one possible implementation of graphics that may be used by the mobile device in the visualization application when calibrating the inertial sensors. As can be seen in comparison to the pose of the mobile device 100 shown in FIG. 1, the mobile device 100 in FIG. 2 is illustrated as rotated with respect to the target 101. Due to the rotation of the mobile device 100, the sensor based graphic 122 has moved to closer alignment with the vision based graphic 120. The process of manually moving the mobile device 100 to align the graphics may provide feedback to calibrate the inertial sensors 110 with respect to the camera 108. Moreover, the visual display of the separate graphics 120 and 122 may provide feedback to the user of the status of the calibration of the inertial sensors 110 to the camera 108. Additionally, as illustrated by text 124 in FIG. 2, a score may be provided to the user to indicate the status of the alignment. Other or additional feedback may be provided to the user as well, such as the horizontal bar 126H and vertical bar 126V, which may indicate the status of alignment along the horizontal and vertical axes, respectively. Moreover, as there are six dimensions, three for rotation and three for translation, six separate graphics, e.g., bars or otherwise, or a subset therefore, e.g., two or more, may be displayed. The graphics 120 and 122 may be rendered as part of a game that encourages the user to move the mobile device in a specific direction to accelerate the convergence of the calibration of the inertial sensors. In other words, the calibration procedure may be presented to the user as a game to be played for entertainment, as opposed to a burdensome administrative process. For example, in a calibration game, the displayed position of the vision based graphic 120 may be periodically moved requiring the user to manipulate the position and orientation of the mobile device 100 to re-align the sensor based graphic 122 with the vision based graphic 120. Thus, the user may be prompted to rotate and/or move the mobile device 100 along one or more axes, and the resulting motion of the mobile device 100 may be used for calibration. With increasingly better calibration, the motion estimated by the inertial sensors will match increasingly closer to the motion solved based on computer vision. The calibration may be determined to be acceptable when the difference between the motion estimated by the inertial sensors and the motion solved based on computer vision matches within a threshold, which may be based on the noise level of the system.

Alignment and non-orthogonality are expected to change very slowly over the life time of the phone. Hence, calibrating alignment and non-orthogonality may be performed infrequently. Scale, however, depends on temperature. While scale can be estimated with bias in an on-going manner, jointly estimating alignment, non-orthogonality, scale, and bias will likely lead to decreased accuracy in the overall calibration parameters. Accordingly, user calibration of the mobile device 100 may be periodically performed or in the event of mechanical stresses on the mobile device 100.

Figure 3:
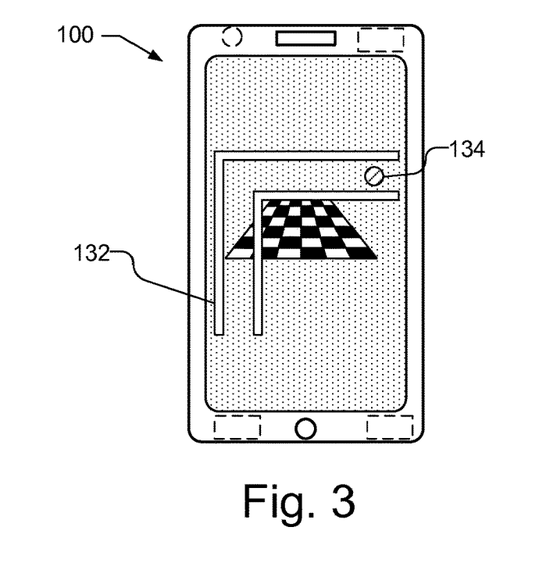
FIG. 3 illustrates another possible implementation of graphics that may be used by the mobile device in the visualization application.

FIG. 3 illustrates another possible implementation of graphics that may be used by the mobile device in the visualization application when calibrating the inertial sensors. A displayed graphic 132 may be based on the computer vision pose and a separate graphic 134 may be based on the sensor based pose. As illustrated in FIG. 3, the vision based graphic 132 may be a maze while the sensor based graphic 134 may be an object to be moved through the maze by user generated motion of the mobile device 100. Thus, as can be seen in FIG. 3, the user will be prompted to rotate or move the mobile device 100 horizontally and vertically to move the sensor based graphic 134 through the vision based graphic 132. The motion of the mobile device 100 may be used to calibrate the inertial sensors 110.

Figure 4:
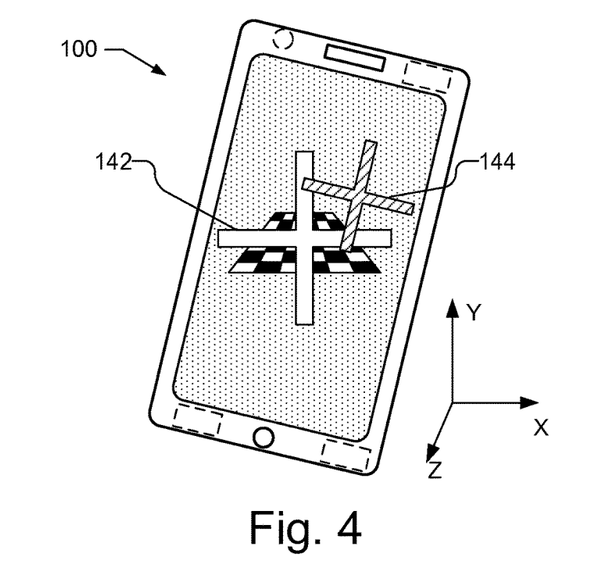
FIG. 4 illustrates another possible implementation of graphics that may by the mobile device in the visualization application.

FIG. 4 illustrates another possible implementation of graphics that may be used by the mobile device in the visualization application when calibrating the inertial sensors. A displayed graphic 142 may be based on the computer vision pose and a separate graphic 144 may be based on the sensor based pose. The vision based graphic 142 and the sensor based graphic 144 may be used, for example, to prompt the user to rotate the mobile device 100, e.g., along the Z axis extending normal to the display 102. Additionally, the user may prompted to move the mobile device 100 forwards and back, e.g., translate the mobile device along the Z axis along the axis that extends normal to the display 102, to alter the size of one or more of the graphics 142, 144 until the graphics are similar in size. Similarly, the user may be prompted to move (translate) the mobile device 100 along the X and Y axes to align the graphics 142, 144 and may be prompted to rotate the mobile device 100 about the X and Y axes based on the appearance of the graphics 142, 144. Thus, it can be seen that the user may be prompted to move the mobile device with 6 degrees of freedom.

Figure 5:
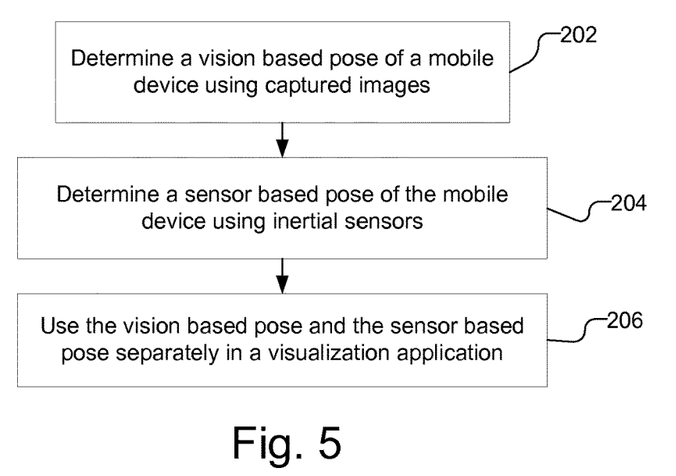
FIG. 5 is a flow chart illustrating a process of using a vision based graphic and a sensor based graphic separately in a visualization application.

FIG. 5 is a flow chart illustrating a process of using a vision based graphic and a sensor based graphic separately in a visualization application. A vision based pose of the mobile device is determined using captured images (202). The vision based pose of the mobile device may be produced using conventional computer vision techniques. For example, for each image new image, features may be extracted using FAST (Features from Accelerated Segment Test) corner detector, Scale Invariant Feature Transform (SIFT), Speeded-up Robust Features (SURF), or any other desired method. The extracted features for the current image may be compared to features from a reference image, which may be a previous image or model of a known or learned target. A homography mapping the positions of the extracted features in the current image to the reference image may provide a pose of the mobile device with respect to the environment with 6 degrees of freedom.

A sensor based pose of the mobile device using inertial sensors is also determined (204). As is well known, a sensor based pose may be determined by integrating the inertial sensor data, e.g., from accelerometers or gyroscopes, over time to determine a change in the pose of the mobile device over the integration time. Thus, by initiating integration of the inertial sensors at the same time as capturing a reference image of the environment with the camera, the sensor based pose of the mobile device can be determined in parallel with determining the vision based pose. It should be understood that the data from the inertial sensors provides a relative change in the pose. The change in pose may be used as the sensor based pose. Alternatively, an initial pose may be provided, e.g., using the computer vision technique or other initialization technique, where the sensor based pose may be deterred as a change from the initial pose. For example, the sensor based pose may be initialized with the vision based pose at regular intervals, e.g., every 5th frame. Between those initialization frames, the change in pose from sensors is used as sensor based pose.

The vision based pose and the sensor based pose are used separately in a visualization application (206). In other words, the vision based pose and the sensor based pose may be used at the same time by the same visualization application, but are not combined so that they are used separately. For example, in the visualization application, a first graphic based on the vision based pose and a second graphic based on the sensor based pose may be displayed. If desired, the vision based pose and the sensor based pose may be used in the visualization application by rendering a single augmentation character with different color channels. Thus, the first graphic may be a first color channel for the single augmentation character and the second graphic may be a second color channel for the single augmentation character.

As discussed above, the visualization application may perform calibration of the inertial sensors using the captured images, wherein the first graphic and the second graphic are rendered to interact with each other based on the calibration of the inertial sensors. For example, the user may be prompted to move the mobile device in a specific direction by moving at least one of the first graphic and second graphic based on a status of a calibration of the inertial sensors, wherein movement of the mobile device in the specific direction accelerates convergence of the calibration of the inertial sensors. For example, after completion of calibration of one calibration parameter, e.g., the X axis, the first graphic and/or the second graphic may be moved to prompt the user to move the mobile device along the Y axis. The Z axis may be similarly calibrated, as well as rotations about the various axes. Additionally, or alternatively, the status of the calibration of the inertial sensors may be, e.g., the calibration accuracy, a confidence in a calibration parameter, an error covariance or a variation of the error covariance. An example of the error covariance or confidence is the result from an Extended Kalman Filter, which may be used for the calibration procedure. Another example could be from another algorithm that estimates the reliability of the estimates. Prompting the user to move the mobile device in the specific direction uses the quality of the calibration of the inertial sensors as feedback to the visualization application to accelerate the convergence of the calibration of the inertial sensors.

The visualization application, however, may be for processes other than calibration. For example, the visualization application may be a motion based game for the mobile device or a photography application that displays a first graphic based on the vision based pose and a second graphic based on the sensor based pose.

Figure 6:
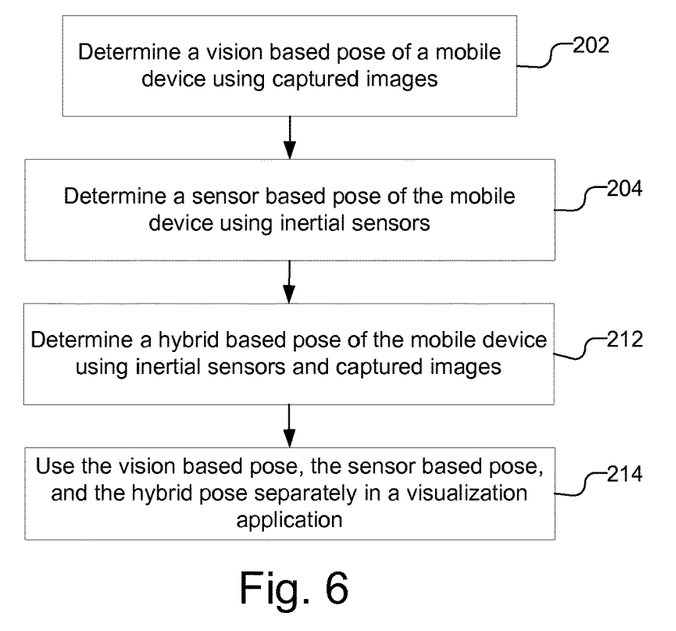
FIG. 6 is a flow chart illustrating a process of using a vision based graphic, a sensor based graphic, and a hybrid graphic in a visualization application.

If desired, additional information may be displayed by the visualization application in the mobile device 100. For example, FIG. 6 is a flow chart, similar to that shown in FIG. 5, but includes additional information used by the visualization application. Thus, as can be seen, the vision based pose and senor based pose are determined (202, 204). Additionally, a hybrid based pose of the mobile device is determined using the captured images and the inertial sensors together (212). For example, if desired, the vision based pose and the sensor based pose may be combined, or the data from the inertial sensors and data from the camera may be combined to form the hybrid based pose. The visualization application uses the vision based pose, sensor based pose, and the hybrid based pose separately (214), e.g., by displaying separate graphics representing each pose. It should be understood that one or both of the graphics displayed based on the vision based pose or the sensor based pose need not be displayed at all times during calibration, e.g., if tracking of the vision based pose is lost, the graphic displayed for the vision based pose may be removed, while the graphic displayed for the sensor based pose is still displayed.

Figure 7:
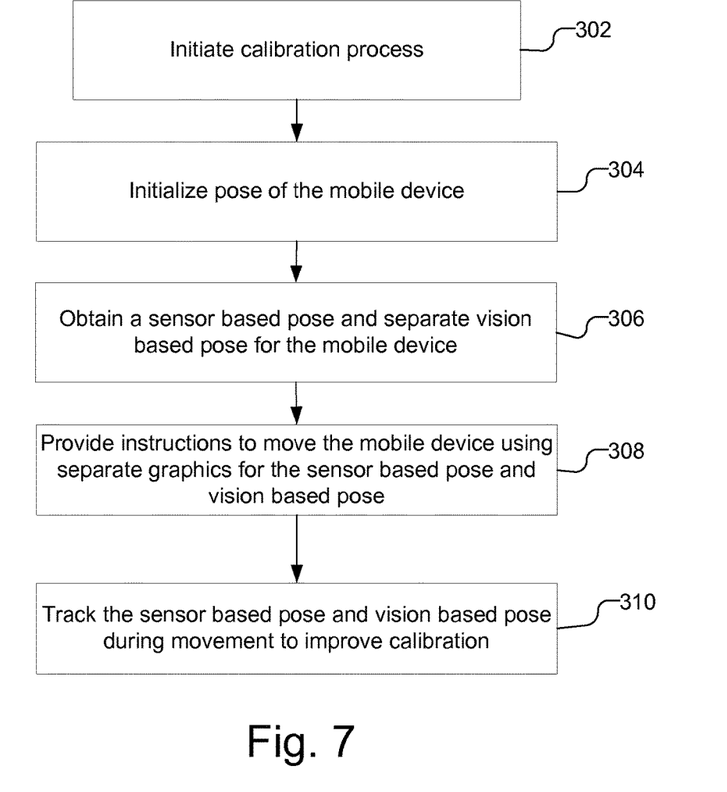
FIG. 7 is a flow chart illustrating a specific embodiment of the visualization application for calibrating the inertial sensors.

FIG. 7 is a flow chart illustrating a specific embodiment of the visualization application in the form of a calibration application for the inertial sensors. As can be seen, the calibration process is initiated (302). The calibration application may be in place of or in addition to the factory calibration and may be pre-installed on the mobile device 100. It may be desirable to automatically initiate the calibration application prior to permitting the use of inertial sensors or, alternatively, the user may initiate the application when desired. The user may be provided with instructions, such as information as to where to find a feature rich target that is appropriate for producing accurate computer vision pose estimates. The mobile device 100 may be placed in a specific position, e.g., face up on a level surface, for initializing the pose of the mobile device (304). The mobile device 100 may indicate to the user when initializing is complete, e.g., by emitting a tone. The mobile device 100 determines a sensor based pose and a separate vision based pose (306). For example, the mobile device 100 capture images or video frames of a reference target to determine a pose and acquire tracking using computer vision, while also determining a pose based on inertial sensors, which are also used for tracking Instructions are provided to the user for moving the mobile device by displaying separate graphics related to the sensor based pose and vision based pose (308). The sensor based pose and vision based pose are individually tracked while the user moves the mobile device to improve calibration (310).

The instructions for moving the mobile device may be generated based on the confidence of each pose estimate, which may be derived from the error covariance from Extended Kalman Filters or from other algorithms. For instance, if the confidence is low for a pose generated by a gyroscope measuring rotation around the Z axis, the user may be instructed to rotate the mobile device around the Z axis while continuing to capture images of the reference target until a threshold value for the confidence is reached. The confidence threshold may be expressed in terms of a score or changes in the displayed graphics to encourage a user to make specific motions to increase the confidence of estimates. Providing a score and/or challenges to the user leverages on a prevalent behavior of a game player to play in order to increase his/her score in a game or finish a challenge. Each time the calibration of one of the calibration parameters is complete, i.e., the confidence level increases beyond a threshold, the user is awarded points. The time it takes the user to complete may also be included in the score. Thus, users are incentivized to manipulate the mobile device to provide input data for the calibration process. Accordingly, user interaction with the mobile device may be used for calibration, thereby obviating the need for expensive factory calibration of the inertial sensors.

Figure 8:
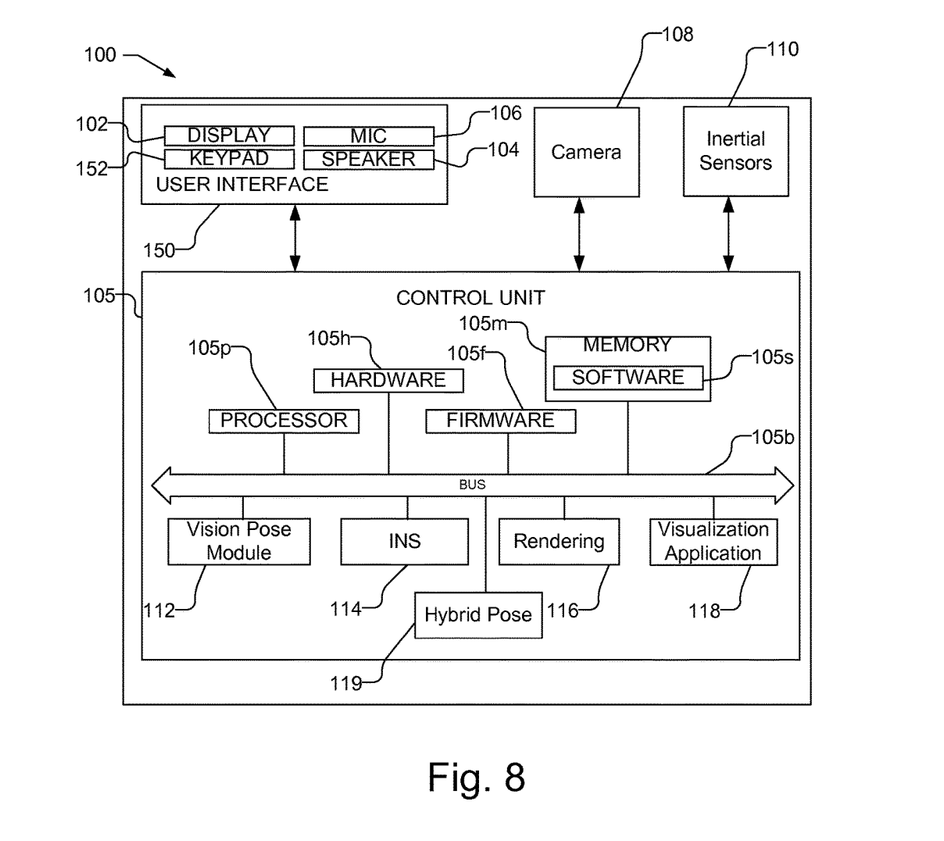
FIG. 8 is a block diagram of a mobile device capable of determining a vision based pose and a sensor based pose and using a vision based graphic and a sensor based graphic separately in a visualization application.

FIG. 8 is a block diagram of a mobile device 100 capable of determining a vision based pose and a sensor based pose and using a vision based graphic and a sensor based graphic separately in a visualization application. The mobile device 100 includes a camera 108 as well as inertial sensors 110, such as accelerometers, gyroscopes or the like. The mobile device 100 further includes a user interface 150, which includes the display 102, as well as a keypad 152 or other input device through which the user can input information into the mobile device 100. If desired, the keypad 152 may be obviated by integrating a virtual keypad into the display 102 with a touch sensor (or gesture control). The user interface 150 may also include the microphone 106 and speaker 104, e.g., if the mobile device 100 is a cellular telephone or the like. Of course, mobile device 100 may include other elements unrelated to the present disclosure.

The mobile device 100 also includes a control unit 105 that is connected to and communicates with the camera 108, inertial sensors 110, as well as the user interface 150, including the display 102. The control unit 105 may be provided by a bus 105b, processor 105p and associated memory 105m, hardware 105h, firmware 105f, and software 105s. The control unit 105 receives and processes images captured by the camera as well as data obtained from the inertial sensors 110, as discussed above. The control unit 105 is further illustrated as including a vision pose module 112 that uses the images captured by the camera 108 to generate the vision based pose using computer vision techniques. The mobile device 100 further includes the INS 114 that uses the output of the inertial sensors 110 to generate the sensor based pose. A rendering module 116 generates a vision based graphic and a sensor based graphic and any other graphical data to be provided to the user, which is shown on display 102. Additionally, a visualization application module 118 uses the vision based pose and sensor based pose and causes the graphics from rendering module 116 to be displayed. For example, the visualization application module 118 may be a calibration module that calibrates the inertial sensors 110 based on the vision based pose and the sensor based pose, as discussed above, or may alternatively be a motion based game or other appropriate type of application, such as a photography application. A hybrid pose module 119 may be included to determine a pose of the mobile device based on the combined vision based pose and sensor based pose, or otherwise determined based on the captured images and inertial sensor data.

The vision pose module 112, INS 114, rendering module 116, visualization application module 118, and hybrid pose module 119 are illustrated separately from processor 105$p$ for clarity, but may be part of the processor 105$p$ or implemented in the processor based on instructions in the software 105$s$ which is run in the processor 105$p$. It will be understood as used herein that the processor 105$p$ can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 105$h$, firmware 105$f$, software 105$s$, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 105$m$ and executed by the processor 105$p$. Memory 105$m$ may be implemented within or external to the processor 105$p$. If implemented in firmware and/or software, the functions may be stored as one or more instructions or code on a storage medium that is computer-readable, wherein the storage medium does not include transitory propagating signals. Examples include storage media encoded with a data structure and storage encoded with a computer program. Storage media includes physical computer storage media. A storage medium may be any available medium that can be accessed by a computer. By way of example, and not limitation, such storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of storage media.

Thus, the mobile device 100 includes a means for means for determining a vision based pose of the mobile device using captured images, which may include, e.g., the camera 108 as well as the vision pose module 112. A means for determining a sensor based pose of the mobile device using inertial sensors may include, e.g., the inertial sensors 110 and INS 114. Means for using the vision based pose and the sensor based pose separately in a visualization application may include, e.g., the visualization application module 118, which may be, e.g., a calibration module, a motion based game, or a photography application. Means for determining a hybrid based pose of the mobile device using the captured images and the inertial sensors, may be a hybrid pose module 119, which may combine the vision based pose and sensor based pose, or otherwise determine a pose based on the captured images and inertial sensor data.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   determining a vision based pose of a mobile device using captured images by extracting features from each new image and comparing the extracted features to features from a reference image, wherein the vision based pose is a first estimate of a position and an orientation of the mobile device produced based on the captured images that are captured by the mobile device;
   determining a sensor based pose of the mobile device using inertial sensors, wherein the sensor based pose is a second estimate of the position and the orientation of the mobile device produced based on data from the inertial sensors that are in the mobile device; and
   using the vision based pose and the sensor based pose separately in an at least one visualization application comprising a photography application that provides prompts to a user to move the mobile device in order to produce a panorama image with a camera on the mobile device, wherein using the vision based pose and the sensor based pose separately in the at least one visualization application comprises rendering a first graphic that moves with respect to a display on the mobile device to prompt the user to rotate the mobile device and rendering a second graphic that is to be kept stationary in the display on the mobile device while the user rotates the mobile device.

2. The method of claim 1, further comprising determining a hybrid based pose of the mobile device using the captured images and the inertial sensors and using the hybrid based pose in the at least one visualization application.

3. The method of claim 1, wherein using the vision based pose and the sensor based pose in the at least one visualization application comprises rendering a single augmentation character, wherein the first graphic is a first color channel for the single augmentation character and the second graphic is a second color channel for the single augmentation character.

4. The method of claim 1, wherein using the vision based pose and the sensor based pose separately in the at least one visualization application further comprises performing calibration of the inertial sensors using the captured images, wherein the first graphic and the second graphic are rendered to perform the calibration of the inertial sensors.

5. The method of claim 4, wherein the first graphic and the second graphic are rendered based on a quality of the calibration of the inertial sensors, wherein the quality of the calibration of the inertial sensors is selected from the group consisting of calibration accuracy, confidence in a calibration parameter, an error covariance, and a variation of the error covariance.

6. The method of claim 4, wherein using the vision based pose and the sensor based pose separately in the at least one visualization application comprises:
prompting a user to move the mobile device in a specific direction with the first graphic and the second graphic, wherein movement of the mobile device in the specific direction accelerates convergence of the calibration of the inertial sensors.

7. The method of claim 1 wherein the at least one visualization application further comprises a motion based game for the mobile device.

8. The method of claim 1, wherein the first graphic is a first vision based graphic based on the vision based pose and the second graphic is a first sensor based graphic based on the sensor based pose that prompt the user to rotate the mobile device while keeping the position of the mobile device stationary for the panorama image.

9. The method of claim 1, wherein the photography application further provides prompts to the user to move the mobile device in order to produce a 3D image with the camera on the mobile device, wherein using the vision based pose and the sensor based pose separately in the at least one visualization application further comprises rendering a sensor based graphic based on the sensor based pose that moves with respect to the display on the mobile device to prompt the user to move the mobile device and rendering the vision based graphic based on the vision based pose that is to be kept stationary in the display on the mobile device while the user moves the mobile device to different perspectives while keeping an imaged subject centered in the display for the 3D image.

10. A mobile device comprising:
a camera that captures images of an environment;
inertial sensors that produce data in response to movement of the mobile device;
a display; and
a processor coupled to the display, coupled to the camera to receive captured images of the environment and coupled to the inertial sensors to receive the data in response to the movement of the mobile device, the processor configured to determine a vision based pose of the mobile device using the captured images by extracting features from each new image and comparing the extracted features to features from a reference image, wherein the vision based pose is a first estimate of a position and an orientation of the mobile device produced based on the captured images; determine a sensor based pose of the mobile device using the data from the inertial sensors, wherein the sensor based pose is a second estimate of the position and the orientation of the mobile device produced based on the data from the inertial sensors; and to use the vision based pose and the sensor based pose separately in an at least one visualization application comprising a photography application that provides prompts to a user to move the mobile device in order to produce a panorama image with the camera on the mobile device, wherein the processor is configured to use the vision based pose and the sensor based pose separately in the at least one visualization application by being configured to render a first graphic that moves with respect to a display on the mobile device to prompt the user to rotate the mobile device and render a second graphic that is to be kept stationary in the display on the mobile device while the user rotates the mobile device.

11. The mobile device of claim 10, wherein the processor is further configured to determine a hybrid based pose of the mobile device using the captured images and the inertial sensors and to cause the display to show a third graphic based on the hybrid based pose.

12. The mobile device of claim 10, wherein the processor is configured to cause the display to show a single augmentation character, wherein the first graphic is a first color channel of the single augmentation character and the second graphic is a second color channel of the single augmentation character.

13. The mobile device of claim 10, wherein the at least one visualization application further comprises calibration of the inertial sensors using the vision based pose and the sensor based pose, wherein the processor is configured to cause the display to show the first graphic and the second graphic to perform the calibration of the inertial sensors.

14. The mobile device of claim 13, wherein the processor is configured to render the first graphic and the second graphic based on a quality of the calibration of the inertial sensors, wherein the quality of the calibration of the inertial sensors is selected from the group consisting of calibration accuracy, confidence in a calibration parameter, an error covariance, and a variation of the error covariance.

15. The mobile device of claim 13, wherein the processor is further configured to prompt a user to move the mobile device in a specific direction with the first graphic and the second graphic, wherein the movement of the mobile device in the specific direction accelerates convergence of the calibration of the inertial sensors.

16. The mobile device of claim 10, wherein the at least one visualization application further comprises a motion based game for the mobile device.

17. The mobile device of claim 10, wherein the first graphic is a first vision based graphic based on the vision based pose and the second graphic is a first sensor based graphic based on the sensor based pose that prompt the user to rotate the mobile device while keeping the position of the mobile device stationary for the panorama image.

18. The mobile device of claim 10, wherein the photography application further provides prompts to the user to move the mobile device in order to produce a 3D image with the camera on the mobile device, wherein using the vision based pose and the sensor based pose separately in the at least one visualization application further comprises rendering a sensor based graphic based on the sensor based pose that moves with respect to the display on the mobile device to prompt the user to move the mobile device and rendering the vision based graphic based on the vision based pose that is to be kept stationary in the display on the mobile device while the user moves the mobile device to different perspectives while keeping an imaged subject centered in the display for the 3D image.

19. A non-transitory storage medium including program code stored thereon, comprising:
  a first program code that when executed by the processor determines a vision based pose of a mobile device using captured images by extracting features from each new image and comparing the extracted features to features from a reference image, wherein the vision based pose is a first estimate of a position and an orientation of the mobile device produced based on the captured images that are captured by the mobile device;
  a second program code that when executed by the processor determines a sensor based pose of the mobile device using inertial sensors, wherein the sensor based pose is a second estimate of the position and the orientation of the mobile device produced based on data from the inertial sensors that are in the mobile device; and
  a third program code that when executed by the processor uses the vision based pose and the sensor based pose separately in an at least one visualization application comprising a photography application that provides prompts to a user to move the mobile device in order to produce a panorama image with a camera on the mobile device, wherein the third program code to use the vision based pose and the sensor based pose separately in the at least one visualization application comprises a fourth program code to render a first graphic that moves with respect to a display on the mobile device to prompt the user to rotate the mobile device and render a second graphic that is to be kept stationary in the display on the mobile device while the user rotates the mobile device.

20. The non-transitory storage medium of claim 19, wherein the third program code that when executed by the processor uses the vision based pose and the sensor based pose separately in the at least one visualization application further comprises fifth program code that when executed by the processor performs calibration of the inertial sensors using the captured images, wherein the first graphic and the second graphic are rendered to perform the calibration of the inertial sensors.

21. The non-transitory storage medium of claim 20, wherein the third program code that when executed by the processor uses the vision based pose and the sensor based pose separately in the at least one visualization application comprises:
  sixth program code that when executed by the processor prompts a user to move the mobile device in a specific direction with the first graphic and the second graphic, wherein movement of the mobile device in the specific direction accelerates convergence of the calibration of the inertial sensors.

22. The non-transitory storage medium of claim 19, wherein the at least one visualization application further comprises a motion based game for the mobile device.

23. The non-transitory storage medium of claim 19, wherein the first graphic is a first vision based graphic based on the vision based pose and the second graphic is a first sensor based graphic based on the sensor based pose that prompt the user to rotate the mobile device while keeping the position of the mobile device stationary for the panorama image.

24. The non-transitory storage medium of claim 19, wherein the photography application further provides prompts to the user to move the mobile device in order to produce a 3D image with the camera on the mobile device, wherein using the vision based pose and the sensor based pose separately in the at least one visualization application further comprises rendering a sensor based graphic based on the sensor based pose that moves with respect to the display on the mobile device to prompt the user to move the mobile device and rendering the vision based graphic based on the vision based pose that is to be kept stationary in the display on the mobile device while the user moves the mobile device to different perspectives while keeping an imaged subject centered in the display for the 3D image.

\* \* \* \* \*